United States Patent [19]

Hall

[11] 4,414,350

[45] Nov. 8, 1983

[54] FERROUS COMPLEXING AGENT FOR AUTODEPOSITION

[75] Inventor: Wilbur S. Hall, Plymouth Meeting, Pa.

[73] Assignee: Amchem Products, Inc., Ambler, Pa.

[21] Appl. No.: 295,582

[22] Filed: Aug. 24, 1981

Related U.S. Application Data

[63] Continuation-in-part of Ser. No. 79,647, Sep. 27, 1979, abandoned.

[51] Int. Cl.[3] ............................................ C08K 5/09

[52] U.S. Cl. .................................... 524/320; 524/300; 524/321; 524/398; 427/435

[58] Field of Search .................... 427/435; 260/29.6 R; 524/300, 321, 320, 398

[56] References Cited

U.S. PATENT DOCUMENTS

| | | | |
|---|---|---|---|
| 3,791,431 | 2/1974 | Steinbrecher | 148/6.2 |
| 3,865,617 | 2/1975 | Shimizu et al. | 427/435 |
| 3,914,519 | 10/1975 | Hall et al. | 427/435 |
| 4,186,219 | 1/1980 | Hall | 427/435 |
| 4,214,022 | 7/1980 | Kunnen et al. | 427/435 |
| 4,215,162 | 7/1980 | Kunnen et al. | 427/435 |

FOREIGN PATENT DOCUMENTS

| | | | |
|---|---|---|---|
| 721146 | 2/1972 | South Africa | 427/435 |

OTHER PUBLICATIONS

Hodgman et al., Handbook of Chem. & Physics, 43rd Ed., Chem. Rubber Co., pp. 1476–1479.

Mehltrettes et al., I & EC, vol. 45, No. 12, pp. 2782–2784, "*Sequestration by Sugar Acids*".

McCutchen, Detergent & Emulsifiers, 1970 Annual Allred Publishing Corp., Ridgewood, N.J., p. 65.

Smith, The Sequestration of Metals, MacMillan Co., N.Y., 1959, pp. 73–76.

*Primary Examiner*—Norman Morgenstern
*Assistant Examiner*—Richard Bueker
*Attorney, Agent, or Firm*—Alexis Barron

[57] ABSTRACT

An autodepositing coating composition of the ferric iron-containing type wherein ferrous iron tends to build up in concentration in the composition and affect adversely the coating capabilities of the composition as it is used continuously to autodeposit coatings on iron-containing surfaces, the improvement comprising adding to said composition, in an amount effective to decrease the amount of ferrous iron which tends to adversely affect the coating capabilities of the composition, a carboxylic acid which is effective in forming a complex with said ferrous iron.

7 Claims, No Drawings

FERROUS COMPLEXING AGENT FOR AUTODEPOSITION

CROSS-REFERENCE TO RELATED APPLICATION

This is a continuation-in-part of application Ser. No. 79,647, filed Sept. 27, 1979 now abandoned.

FIELD OF THE INVENTION

This invention relates generally to autodeposition, and more particularly, to improved means for maintaining the effectiveness of an autodepositing composition.

Water-based coatiing compositions which are effective, without the aid of electricity, in forming on metallic surfaces immersed therein organic coatings that increase in thickness or weight the longer the time the surfaces are immersed in the compositions are known. (For convenience, a coating formed from such a composition is hereinafter referred to as an "autodeposited coating"). Speaking generally, autodepositing compositions which are so effective comprise acidic aqueous coating solutions having dispersed therein particles of an organic material such as resin particles. In the formation of an autodeposited coating on a metallic surface, the metallic surface is dissolved to form corresponding metal ions in amounts which cause the particles to deposit on the surface in a manner such that there is a continuous buildup of organic coating on the surface.

Coatings formed from such compositions are distinctly different from coatings formed by immersing the metallic surfaces in conventional latices, that is, compositions comprising solid resin particles dispersed in water. The weight or thickness of a coating formed by immersing a metallic surface in a conventional latex is not influenced by the time the surface is immersed in the latex. It is in the main influenced by the amount of resin solids dispersed in the aqueous medium.

Coatings formed from autodepositing compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of autodepositing compositions offers a number of advantages. For example, other factors held constant, they can be used to apply thicker organic coatings to metallic surfaces in a relatively short period of time and in a one-step operation. Also, the coating thickness can be controlled by varying the immersion time of the metallic surface in the coating composition. In general, coatings which have improved corrosion resistant properties and aesthetic appearance are obtainable. These are but a few of the advantages which flow from the use of said compositions.

It is known that as autodepositing compositions are used continuously to coat metallic surfaces immersed therein, coatings formed from the composition tend to become thinner, the longer the use. Continued use of the compositions can result in the destabilization of the compositions as manifested by the tendency of the dispersed solid particles to flocculate, coagulate and/or gel throughout the compositions.

The present invention is directed to maintaining the effectiveness of an autodepositing composition of the ferric iron-containing type, as defined herein, which forms autodeposited coatings on a ferrous metal surface as the composition is used in a continuous operation to coat ferrous metal surface. The term "ferrous" as used herein means iron and alloys of iron.

REPORTED DEVELOPMENTS

Autodepositing compositions and the use thereof are disclosed in U.S. Pat. Nos.: 3,585,084; 3,592,699; 3,776,848; 3,791,431; 3,795,546; 3,829,371; 3,839,097; 3,914,519; 3,936,546; 3,955,532; 3,960,610; 4,012,351; 4,030,945; 4,103,049; 4,104,424; 4,108,817; 4,186,216; and 4,214,022. The patents discussed below disclose various methods for maintaining the effectiveness of autodepositing compositions as they are used.

U.S. Pat. No. 3,791,431 discloses treating autodepositing compositions in a manner such that excessive amounts of metal ions, which tend to build up in the composition as it is used continuously and which cause the composition to become unstable, are removed or converted to an innocuous form, including a soluble chelated form. This patent discloses a type of autodepositing composition which includes an organic coating-forming material, acid, and an oxidizing agent, for example, hydrogen peroxide. (For convenience, this composition is referred to hereafter as "the $H_2O_2$-containing type" of autodepositing composition.) Another type of autodepositing composition, and one that is not disclosed specifically in U.S. Pat. No. 3,791,431, is described in U.S. Pat. Nos. 4,103,049 and 4,186,219. These patents disclose autodepositing compositions comprising an organic coating-forming material, HF, and dissolved ferric iron. In formulating this type of composition, a source of ferric iron is added. (For convenience, this composition is referred to hereafter as "the ferric iron-containing type" of autodepositing composition).

One of the many differences between the $H_2O_2$-containing type and the ferric iron-containing type compositions is that the nature of the former is such that metal which is dissolved from the metal substrate is oxidized promptly to a higher valence state. For example, in coating an iron substrate, iron is oxidized initially to ferrous iron which is then oxidized by $H_2O_2$ (or other equivalent oxidizing agent) to the ferric state. On the other hand, with the ferric iron-containing type of autodepositing compositions, there is little or no tendency for the ferrous iron which is dissolved initially from the substrate to be oxidized to the ferric state, and accordingly, ferrous iron tends to build up in concentration in the aqueous phase of the composition during continuous use of the composition.

U.S. Pat. No. 4,186,219 recognizes the specific problem of ferrous iron build-up in the ferric iron-containing composition and discloses controlling the ferrous iron build-up by adding to the composition, as needed, hydrogen peroxide which is effective in oxidizing ferrous iron to ferric iron. The ferric iron can then be removed from the composition by precipitation with phosphoric acid, for example, as disclosed in U.S. Pat. No. 3,791,431. This combined use of oxidizing agent and phosphoric acid can lead to the formation of ferric phosphate sludge, which should be removed from the composition as excessive quantities accumulate.

It is an object of the present invention to provide improved means for maintaining the coating effectiveness and the stability of a bath of autodepositing composition, to thereby prolong the usefulness of the composition.

SUMMARY OF THE INVENTION

Speaking generally, the present invention relates to the use in a ferric iron-containing type of autodepositing composition of a carboxylic acid which is effective in complexing the ferrous iron which tends to build up in concentration in the composition as the composition is used to coat iron-containing surfaces. Carboxylic acids particularly effective in complexing ferrous iron in such autodepositing compositions, as exemplified in the examples below, have a dissociation constant of about $1.5\times10^{-5}$ to about $1\times10^{-3}$.

In preferred form, the present invention involves the use of an autodepositing composition prepared from a latex, hydrofluoric acid and a ferric salt, preferably ferric fluoride, and the use of a carboxylic acid having a dissociation constant of about $1.5\times10^{-5}$ to about $1\times10^{-3}$ which is effective in complexing ferrous iron in the composition.

The use of the ferrous complexing agent according to the present invention avoids or minimizes problems normally encountered as a result of the build-up of ferrous iron in dissolved form in the aqueous phase of the autodepositing composition. Examples of such problems include a reduction in the rate of coating formation by the composition, the formation of coatings which have a reduced tendency to resist a water rinse, and coagulation of resin throughout the composition. Compared to the heretofore known method for coping with ferrous build-up which involves the formation of ferric phosphate sludge, as mentioned above, one of the advantages of the present invention is that the steps of collection and disposal of such sludge can be avoided.

DETAILED DESCRIPTION OF THE INVENTION

Coating-forming materials used in autodepositing compositions include resins which are soluble in the composition or which are capable of being dispersed therein in the form of solid particles or in emulsified form. The use of dispersed resin particles, most preferably supplied in the form of a latex, is preferred. Examples of resins that can be used are polyethylene, polyacrylics and styrenebutadiene copolymers. In addition, epoxy resins can be used. For example, epoxy resins such as, for example, EPON resins, products of Shell Chemical Co., can be emulsified with toluene to produce a water-emulsified epoxy resin or ARALDITE resins, products of Ciba-Geigy, can be emulsified to produce a water-emulsified epoxy resin. Particularly useful latices comprise styrene-butadiene latices sold under the trademark DAREX, by W. R. Grace & Co.

The amount of resin utilized can vary over a wide range. The lower concentration limit is dictated by the amount of resin needed to provide sufficient material to form a coating. The upper limit is dictated by the amount of material that can be dispersed, dissolved or emulsified in the coating composition. The composition can comprise about 5 to about 550 g/l. Preferably, about 100 to about 300 g/l of resin is used, although good results have been achieved also with coating baths containing about 50 g/l of resin.

The preferred autodepositing composition is prepared from hydrofluoric acid and has a pH of about 1.6 to about 5. The preferred amount of hydrofluoric acid is about 0.2 to about 5 g/l of composition. Although other acids may be used, as known, hydrofluoric acid has the advantage that its anion complexes with ferric iron.

The preferred autodepositing composition is prepared from a soluble ferric salt such as, for example, ferric nitrate or ferric chloride, but most preferably ferric fluoride. The preferred make-up concentration of ferric iron in the composition is about 0.5 to about 5 g/l. It is possilbe also to establish the initial concentration of ferric iron in situ by including in the composition an oxidizing agent, for example, hydrogen peroxide which is capable of oxidizing ferrous iron dissolved from the iron substrate to the ferric form, and in the desired operative amount.

As the preferred autodepositing composition is used, it is believed that ferrous iron is formed as follows:

$$Fe^{\circ}+2H^{+}\rightarrow Fe^{++}+H_2$$

$$Fe^{\circ}+2FeF_3\rightarrow 3Fe^{++}+6F^{-}$$

In the above equations, the $Fe^{\circ}$ is the ferrous substrate being coated, the $H^{+}$ is from the dissociation of HF (or other acid), and the $FeF_3$, which functions as the bath activator, is initially added as a ferric salt as noted above. In the absence of a constituent in the composition which oxidizes the ferrous iron to ferric iron, there is a build-up in the composition of ferrous iron. Although ferrous iron generated from the substrate plays a necessary role in the formation of the coating as resin is destabilized in the region of the substrate, if excessive amounts of ferrous iron are allowed to accumulate in the composition, the problems referred to above can be encountered.

The redox potential or oxidizing strength of the composition tends to decrease as the ferric/ferrous ratio decreases. Therefore, the coating rate tends to decrease as the ferrous ion concentration increases. Thus, to maintain the coating rate, the concentration of ferrous ion should be reduced.

In accordance with the present invention, the concentration of ferrous iron can be controlled by adding to the autodepositing composition one or more carboxylic acids which are effective in forming a ferrous iron complex. Useful carboxylic acids include, for example, succinic, citric, itaconic, malic, lactic, gallic, tartaric, fumaric, glacial acrylic, and acetic. The preferred carboxylic acid is citric acid. the carboxylic acid should be used in an amount sufficient to complex enough ferrous iron to maintain the effectiveness of the composition.

As is typically the case in autodeposition, there are many factors which have an influence on the numerical value at which the concentration of the ferrous iron should be maintained, and accordingly, it is recommended that for any particular process, empirical determinations be made as to the value or range of values within which the concentration should be maintained. This will govern the amount of carboxylic acid complexing agent to use, which amount can vary for a particular application, depending on the particular acid selected for use. For guideline purposes, it is recommended that there be added to the composition about 0.5 to about 10 g/l of the carboxylic acid complexing agent. The complexing agent can be added to the composition periodically or continuously.

The addition of a ferrous iron complexing agent to a bath of autodepositing composition permits the bath to be operated for a longer period of time without having to add an oxidizing agent such as, for example, hydrogen peroxide, which is capable of oxidizing ferrous iron to ferric iron. (Another advantage of the present invention is that the ferrous iron complexing agent is not consumed, as is hydrogen peroxide, in converting the ferrous iron to its innocuous state). However, although not required, hydrogen peroxide may be added to the bath in a sufficient amount to oxidize at least some ferrous iron to ferric iron. This frees ferrous iron complexing agent to complex ferrous iron not complexed while forming, in situ, ferric iron which is one of the essential constituents of the bath. With continued use of the bath, the ferrous iron complexing agent will be depleted eventually through drag-out, but at a rate that is very slow relative to the consumption of an oxidizing agent, as used in the prior art method described above.

As mentioned above, ferric iron is an essential constituent of the bath. As ferrous substrates are coated, ferric iron is consumed. Other factors held constant, the lower the concentration of ferric iron, the lower the rate of dissolution of the substrate, and the slower the rate of coating formation. The concentration of ferric iron can be increased by forming it in situ as described above, that is, by use of an oxidizing agent to oxidize ferrous iron or by adding additional ferric-containing material to the composition.

A method of monitoring the decrease in ferric iron concentration or increase in uncomplexed ferrous iron concentration is by measuring the redox potential of the composition. Any suitable instrument which is capable of measuring a difference in potential in millivolts can be used. For example, a potentiometer having a calomel cell, or other suitable reference cell, and a platinum electrode can be used. The electrodes are contacted with the composition and the electrical potential between the two electrodes is measured. In the use of such an apparatus, it may be observed that as the composition is used and the ratio of ferric to ferrous iron decreases, the millivolt reading of the instrument tends to fall. Accordingly, for any particular application, the millivolt reading can be related to the point at which coatings of unsuitable thickness are formed. In effect, the millivolt reading range of a satisfactorily operating composition can be determined and steps taken to maintain the millivolt reading within the desired range. As the ferrous iron concentration decreases, the ferric/ferrous ratio increases, and the millivolt reading increases.

A decrease in the coating rate, once observed, may be reversed either by adding more ferric iron in the form of a ferric salt, such as noted above, or by generating more ferric iron in situ by the addition of an amount of oxidizing agent, such as hydrogen peroxide, effective to oxidize sufficient ferrous iron to restore the ferric iron to its desired concentration. The addition of oxidizing agent restores the ferric iron concentration to the desired level, removes ferrous iron from the bath through oxidation to ferric iron, and regenerates the ferrous iron complexing agent.

In various applications, it will be found that the ferric/ferrous ratio does not rapidly decrease during continuous use of the composition, and therefore, the addition of a ferric salt or generation of ferric iron in situ by use of an oxidizer will not be required frequently. Hydrogen peroxide is the preferred oxidizing agent since it rapidly oxidizes ferrous iron to ferric iron and forms water, a constituent of the composition.

The present invention can be used with autodepositing baths operated in the usual way. Examplary operating conditions follow. The bath can be operated at room temperature and may be maintained at a temperature of about 20° C. to about 40° C. Contact times between the substrates and the composition can be about 15 seconds to about 10 minutes, preferably about 30 seconds to about 5 minutes, and can be accomplished conveniently by immersion. Other ingredients can be included in minor amounts in the compositions. For example, coalescing agents (e.g. ethylene glycol monobutyl ether) and pigments (e.g. titanium dioxide and carbon black) can be included. Examplary amounts of optional ingredients range from about 1 g/l or less to about 100 g/l, or more, depending upon the nature of the ingredient and the particular composition used.

After contact with the coating composition, the coated metallic surface can be subjected to further processing steps, as are known. Such steps are described briefly hereafter.

Water rinsing the coated surface after it has been withdrawn from the composition, and before significant drying takes place, is effective in removing therefrom residuals such as acid and other ingredients of the bath that adhere to the coated surface.

If desired, the coated surface can be contacted with a material which is effective in improving the corrosion-resistant properties of the coating or which is effective in otherwise modifying the properties of the coating. By way of example, it is noted that the wet coated surface can be contacted with an aqueous rinse solution containing hexavalent chromium or a mixture of hexavalent chromium and a reduced form of chromium, for example, formaldehyde-reduced chromium. Such chromium rinse compositions are known. Other materials can be used as desired, and also, if desired, the thus treated surface can be subjected to a subsequent water rinse to remove residuals that may adversely affect the properties of the coating.

Following any rinse steps employed after the coated surface is withdrawn from the composition, the coating should be dried. Fusion of the resinous coating renders it continuous, thereby improving its resistance to corrosion and adherence to the underlying metallic surface. The conditions under which the drying and/or fusion operation is carried out depend somewhat upon the type of resin employed. In general, heat will be required to fuse the resin. As known, certain types of coating-forming materials, for example, epoxy resins, should be cross-linked or cured.

EXAMPLES

The following examples serve to illustrate, but not to limit, the present invention.

EXAMPLE 1

In an effort to find suitable ferrous iron complexing agents, several carboxylic acids were evaluated as follows:

(1) DAREX 637 styrene-butadiene latex was diluted to 10 percent weight/volume solids. Aliquots of 100 ml each were placed in 15 glass jars.

(2) To each jar containing the above latex was added 0.5 gram of a carboxylic acid dissolved in 10 ml of water. The carboxylic acids used are given in Table 1 below.

(3) A coagulating solution was prepared by dissolving 25 grams of $FeSO_4.7H_2O$ in water and diluting to 1 liter. Ten ml of this solution were added to each glass jar.

(4) Each of the latex solutions containing a carboxylic acid and coagulant was allowed to stand for 72 hours. No coagulation was apparent to the naked eye for any solution containing a carboxylic acid. A control, containing only latex and coagulant and no carboxylic acid, coagulated almost immediately.

(5) Another 10 ml of $FeSO_4.7H_20$ coagulant were added to each glass jar. After several hours, no coagulation was yet apparent to the naked eye. Microscopic examinations of the solutions at 100x then were made. Also the behavior of each of the solutions was visually observed upon filtration through "qualitative" filter paper. The results are presented in Table 1 below.

TABLE 1

| | Solutions Containing Latex(1), Coagulant(2) and Specified Carboxylic Acid | | |
|---|---|---|---|
| Carboxylic Acid | Dissociation Constant | Microscopic Examination | Filtration |
| None(3) | — | Coagulation | Coagulated |
| Succinic | $6.4 \times 10^{-5}$ | Excellent | Excellent |
| Itaconic | $1.5 \times 10^{-5}$ | Excellent | Excellent |
| Gallic | $4 \times 10^{-5}$ | Excellent | Excellent |
| Lactic | $1.4 \times 10^{-4}$ | Moderate Flocculation | Excellent |
| Tartaric | $9.6 \times 10^{-4}$ | Excellent | Excellent |
| Malonic | $1.4 \times 10^{-3}$ | Slight Flocculation | Blinds Very Slowly |
| Malic | $4 \times 10^{-4}$ | Excellent | Excellent |
| Diglycolic | $1.1 \times 10^{-3}$ | Grainy | Blinds Very Slowly |
| Fumaric | $9.3 \times 10^{-4}$ | Excellent | Excellent |
| Citric | $8.7 \times 10^{-4}$ | Excellent | Excellent |
| Glacial Acrylic | $5.5 \times 10^{-5}$ | Excellent | Excellent |
| Acetic | $1.8 \times 10^{-5}$ | Excellent | Excellent |
| Maleic | $1 \times 10^{-2}$ | Flocculation | Blinds Quickly |

(1)DAREX 637
(2)$FeSO_4.7H_2O$
(3)control run

The results reported in Table 1 above indicate that the following acids are effective as ferrous complexing agents in a latex composition: succinic, itaconic, gallic, lactic, tartaric, malic, fumaric, citric, glacial acrylic and acetic acids. The following carboxylic acids (having the relatively high dissociation constants noted in Table 1) were not effective as ferrous complexors: malonic, maleic and diglycolic acids. Under similar conditions, mineral acids such as sulfuric, hydrochloric and nitric acids, were found to be ineffective as ferrous complexing agents in that latex destabilization occurred rapidly.

EXAMPLE 2

Autodepositing coating compositions were prepared as follows: 180 grams of DAREX 637 latex and 5 grams of AQUABLAK 115 aqueous pigment dispersion (a carbon black pigment, product of Borden Chemical Co.) were placed in a 1 liter polyethylene beaker and the resulting mixture was diluted to a volume of 950 ml. Fifty ml of a solution containing 3 grams of ferric fluoride and 2.3 grams of HF were added to the mixture to make 1 liter of coating composition.

To 1 liter of the above composition, 5 grams of citric acid were added. Unpolished cold-rolled steel Q-panels (3"×4") were immersed for 90 seconds in this composition. A total of 6 square feet of Q-panel was coated, after which it was found that the citric acid-containing composition had a 50% greater redox potential (155 versus 103) and provided a coating having approximately a 20 percent greater film thickness (0.95 mil versus 0.80 mil), as compared to the use of a control composition containing identical ingredients, but without citric acid.

EXAMPLE 3

A composition identical to that of Example 2, except that (a) no pigment was used and (b) 5 grams of fumaric acid were substituted for the 5 grams of citric acid, was prepared. Q-panels (3"×4" unpolished, cold-rolled steel) were immersed for 90 seconds in the composition. A total of 12 square feet of panel were coated before hydrogen peroxide addition became necessary to maintain the rate of coating formation. This represents a doubling of square footage of panel coated as compared to a control composition without fumaric acid. With periodic replenishment and peroxide addition, a total of 40 square feet of Q-panel were coated using the fumaric acid-containing composition, which represents a complete bath "turn-over".

It should be understood that carboxylic acids and other than the ones exemplified in the above examples can be used in the practice of the invention. Such other acids should be soluble in the autodepositing composition, as are the carboxylic acids exemplified above.

I claim:

1. An acidic aqueous autodepositing coating composition of the ferric iron-containing type wherein ferrous iron tends to build up in concentration in the aqueous phase of the composition and affect adversely the coating capabilities of the composition as it is used continuously to form an autodeposited coating on ferrous surfaces, said composition comprising an organic coating-forming material, dissolved ferric iron and hydrofluoric acid, and including also dissolved ferrous iron and, in an amount effective to maintain the coating capabilities of the composition, a carboxylic acid which is soluble in the composition and which is effective in forming a complex with said ferrous iron in the composition, said carboxylic acid having a dissociation constant of about $1.5\times10^{-5}$ to about $1\times10^{-3}$ and being selected from the group consisting of succinic, citric, itaconic, malic, lactic, tartaric, fumaric, glacial acrylic, gallic and acetic acid and a mixture of two or more of said acids.

2. A composition according to claim 1 wherein said carboxylic acid is citric acid.

3. A composition according to claim 1, or 2 wherein said carboxylic acid is present in an amount of about 0.5 to about 10 g/l.

4. A composition according to claim 3 wherein said coating-forming material comprises dispersed solid resin particles and wherein ferric fluoride is a source of said dissolved ferric iron.

5. A composition according to claim 4 including also pigment.

6. An acidic aqueous autodepositing coating composition of the ferric iron-containing type wherein ferrous iron tends to build up in concentration in the aqueous phase of the composition and affect adversely the coating capability of the composition as it is used continuously to form an autodeposited coating on ferrous surfaces, said composition comprising dispersed solid resin particles, ferric fluoride, and hydrofluoric acid, and including also dissolved ferrous iron and about 0.5 to about 10 g/l of a carboxylic acid having a dissociation constant of about $1.5\times10^{-5}$ to about $1\times10^{-3}$, said carboxylic acid being selected from the group consisting of succinic, citric, itaconic, malic, lactic, tartaric, fumaric, glacial acrylic, gallic and acetic acid and a mixture of two or more of said acids.

7. A composition according to claim 6 wherein said carboxylic acid is citric acid.

* * * * *